United States Patent [19]
Jensen et al.

[11] 3,898,659

[45] Aug. 5, 1975

[54] DATA STORAGE AND CONVERSION SYSTEM

[75] Inventors: Garold K. Jensen, Alexandria, Va.; James E. McGeogh, Silver Spring, Md.

[73] Assignee: The United States of America as represented by the Secretary of the Navy, Washington, D.C.

[22] Filed: June 9, 1969

[21] Appl. No.: 833,243

[52] U.S. Cl. ................................. 343/8; 343/9
[51] Int. Cl.² .................................... G01S 9/44
[58] Field of Search ................. 343/5 DP, 8, 9

[56] References Cited
UNITED STATES PATENTS
3,483,557  12/1969  Skenderoff et al. .............. 343/9

Primary Examiner—T. H. Tubbesing
Attorney, Agent, or Firm—R. S. Sciascia; Arthur L. Branning

[57] ABSTRACT

System for presenting multi-parameter radar target information by six two-dimensional displays. Outputs from parallel range bin analyzer channels are thresholded to prevent collapsing losses. Sample and hold circuits sample the outputs of all range bins at each velocity and hold for a full velocity bin. The resulting output is written in continuously advancing shift registers once per loop cycle. Readouts are coupled to CRO's. The proper circuitry for timing the process, such as counters, clock circuits, sweep generators, etc., is also provided.

12 Claims, 10 Drawing Figures

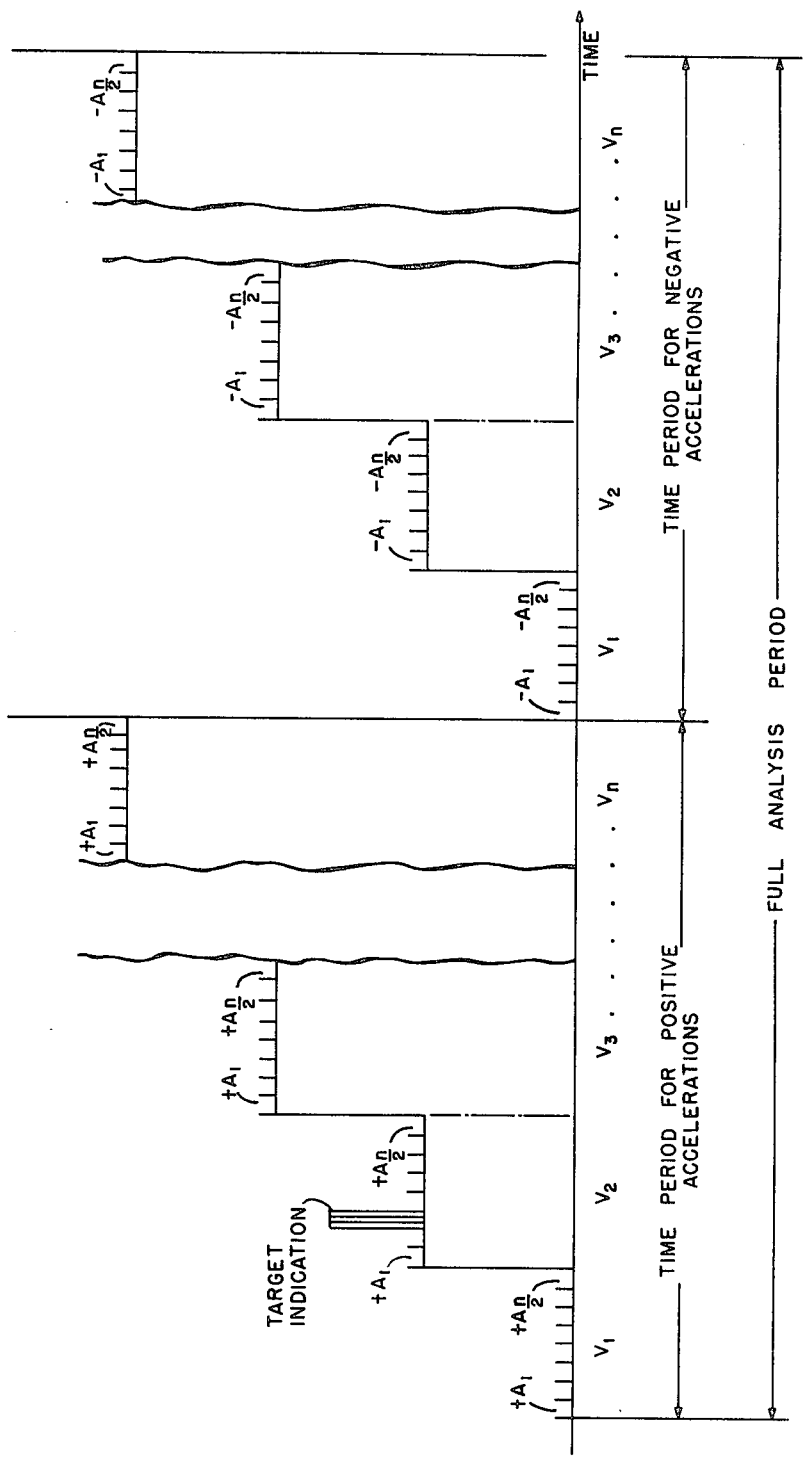

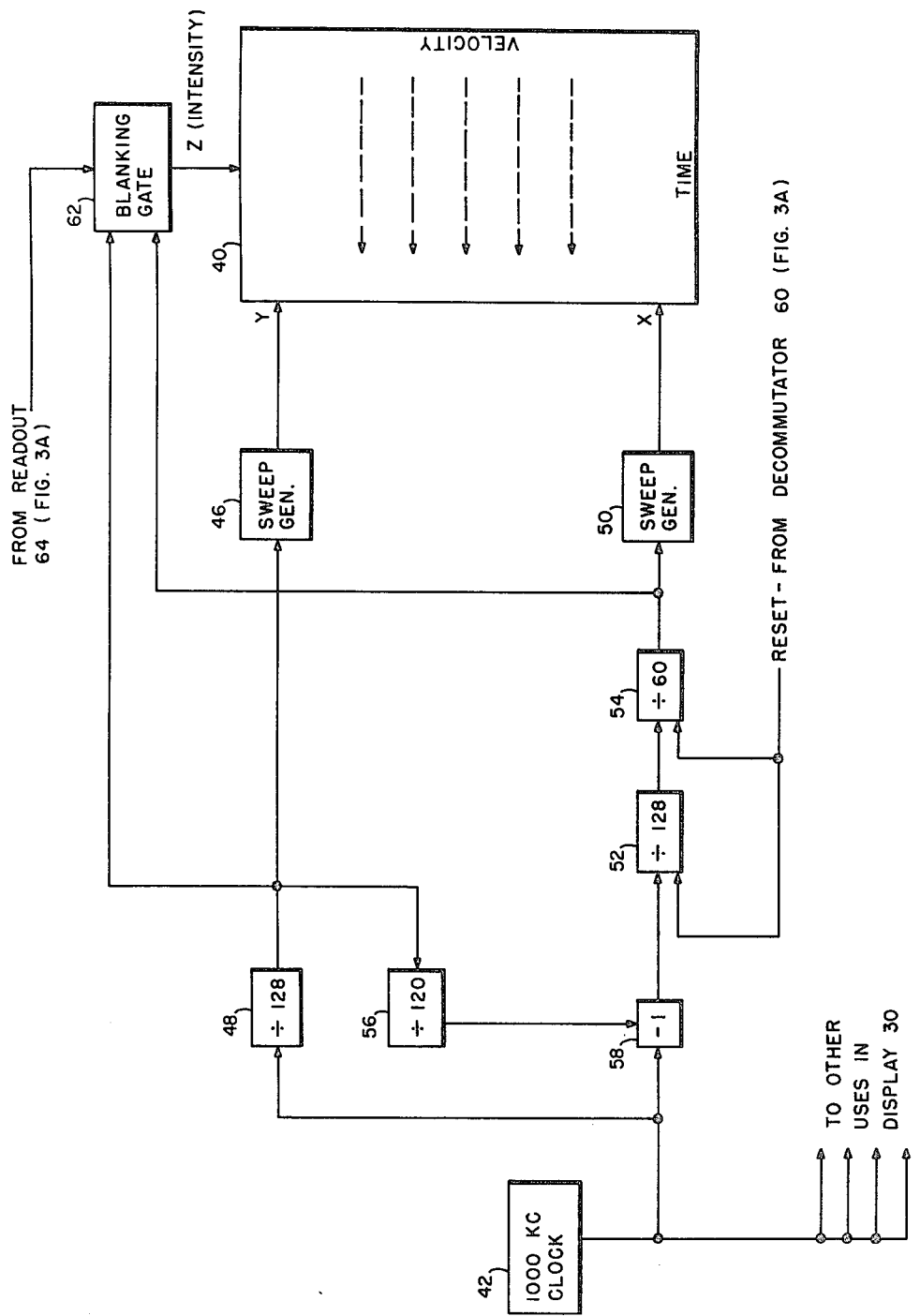

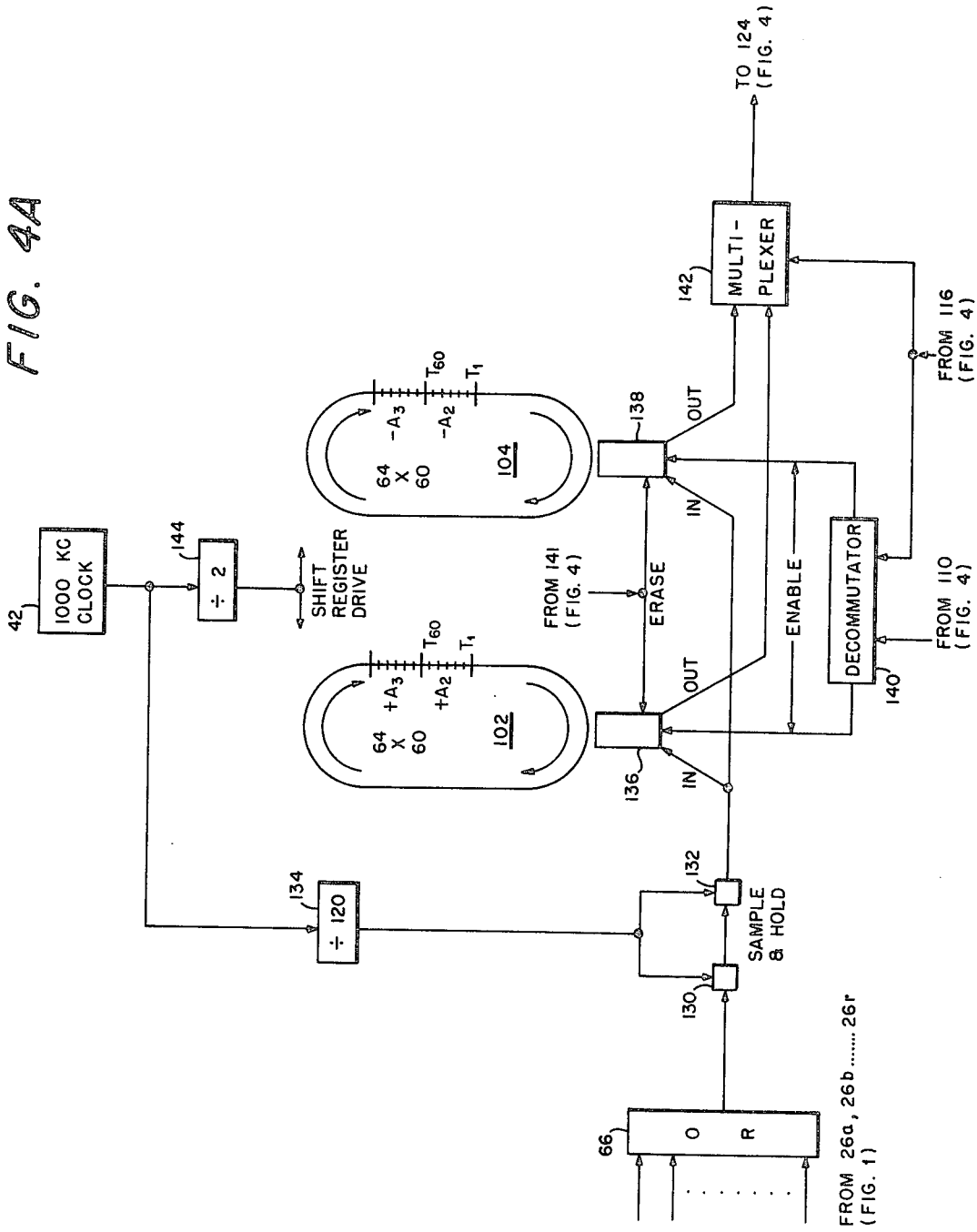

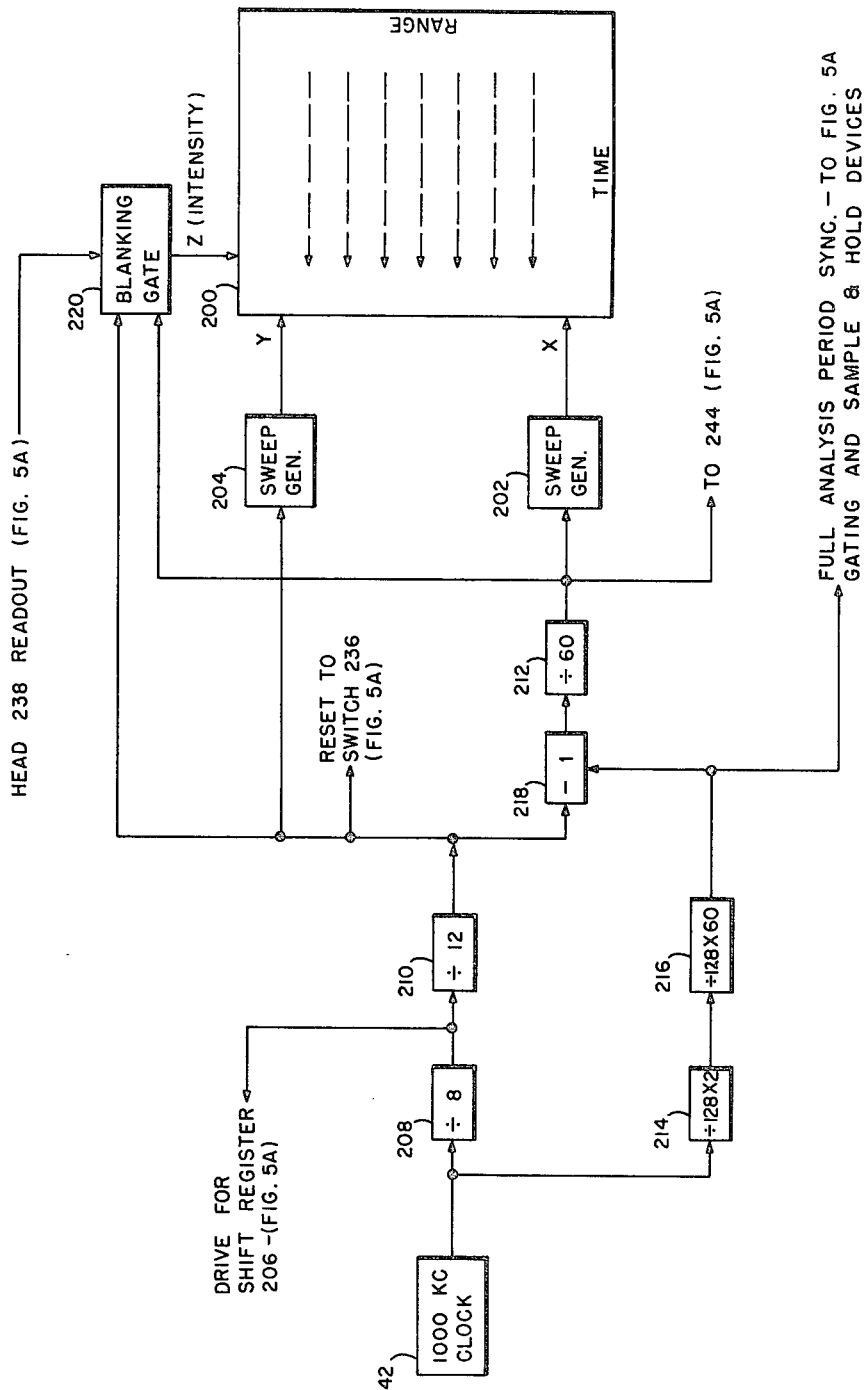

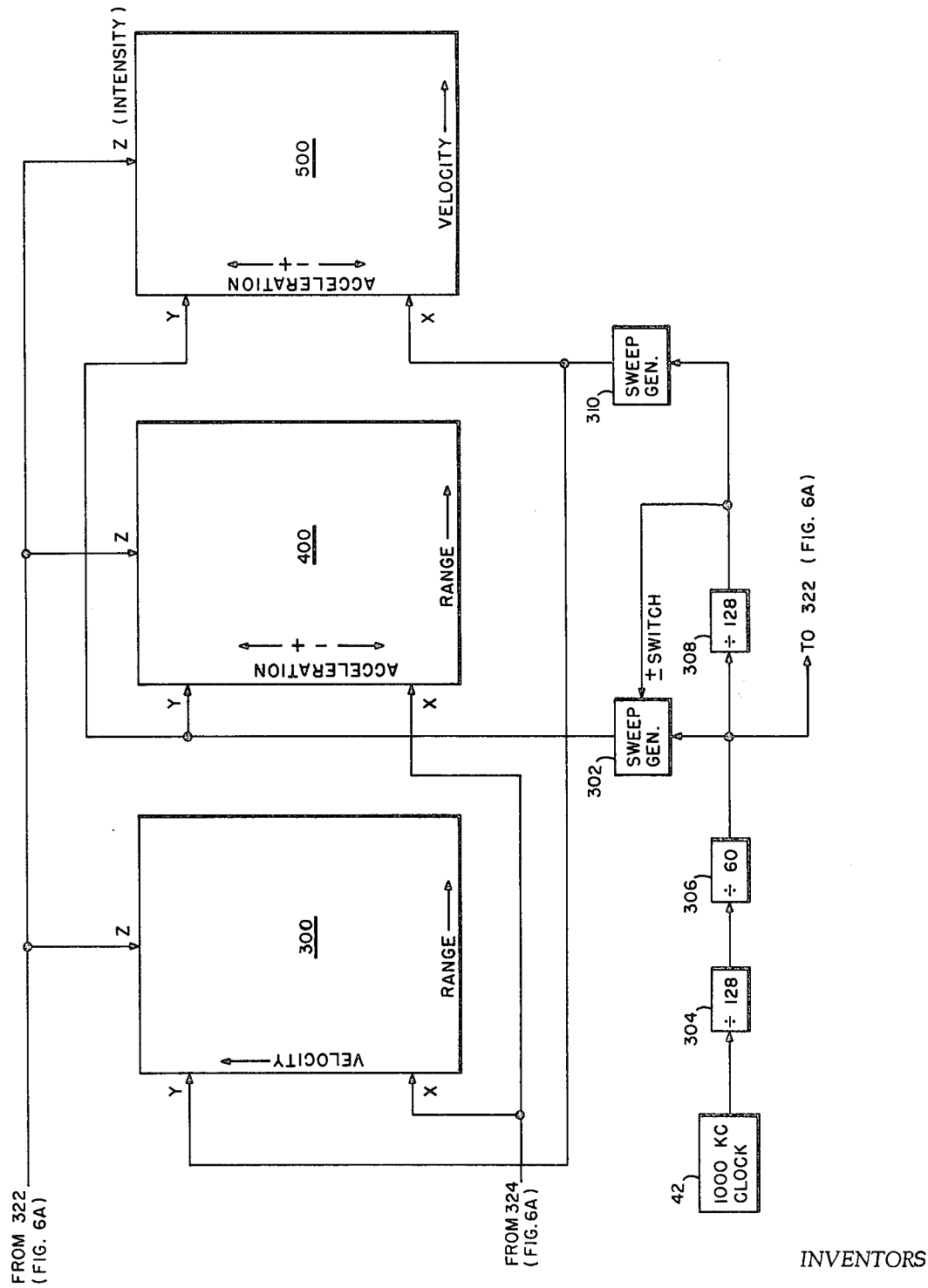

3,898,659

DATA STORAGE AND CONVERSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Concurrent with the development of missiles of extremely high velocities and with the development of radars that can scan and detect targets over large areas, there has arisen the need for systems which can very rapidly process and display the tremendous amount of information available from the radar return.

The difficulty of the problem of designing such display systems is magnified because of the desirability of providing the radar return information displayed in multi-parameter form on two-dimensional displays, i.e., CRO devices, while avoiding, to the greatest possible extent, any degradation of the signal due to collapsing losses.

Prior display systems for modern radars are, in general, classifiable into one of three categories. Some of these systems have avoided collapsing losses by offsetting each displayed element to avoid noise buildup. These systems are somewhat less than completely satisfactory because of the complexity of the display circuitry and because the display time is inherently long compared to some other approaches.

Other dispaly systems have reduced the collapsing loss by gating the unresolved parameter, but at the expense of losing data in the parameter area rejected by the gate.

SUMMARY OF THE INVENTION

Yet another approach to the problem of rapidly displaying radar returns with a minimum of collapsing loss, and the approach used in the invention disclosed herein, is by the use of threshold circuits set for an acceptable false alarm rate which avoids a noise buildup while retaining a great majority of target information.

The invention further contemplates circuitry whereby the radar return information, after the threshold processing, is displayed in two-dimensional form on CRO devices with various parameters collapsed. Specifically, CRO circuits and displays of Range vs Velocity (R-V); Range vs Acceleration (R-A); Velocity vs Acceleration (V-A); Range vs Time (R-T); Velocity vs Time (V-T) and Acceleration vs Time (A-T) are contemplated.

OBJECTS OF THE INVENTION

It is, therefore, an object of the invention to provide an improved display system for radar.

Another object of the invention is the provision of an improved display system for radar wherein multiparameter information is presented in a plurality of two-dimensional displays.

A still further object of the invention is to provide an improved display system for radar wherein multiparameter information is presented in a plurality of two-dimensional displays and wherein collapsing losses are minimized by the use of threshold circuits.

DESCRIPTION OF THE DRAWINGS

Other objects and advantages of the invention will hereinafter become more fully apparent from the following description and the annexed drawings, which illustrate a preferred embodiment, and wherein:

FIG. 2 shows a signal-time sequence which is useful in understanding the invention.

FIGS. 3 and 3A illustrate the part of the invention which relates to the Velocity vs Time display.

FIGS. 4 and 4A illustrate the part of the invention which relates to the Acceleration vs Time display.

FIGS. 5 and 5A illustrate the part of the invention which relates to the Range vs Time display, and FIGS. 6 and 6A illustrate the part of the invention which relates to the Velocity vs Range, Acceleration vs Range and the Velocity vs Acceleration displays.

DESCRIPTION OF THE INVENTION

Figure 1:
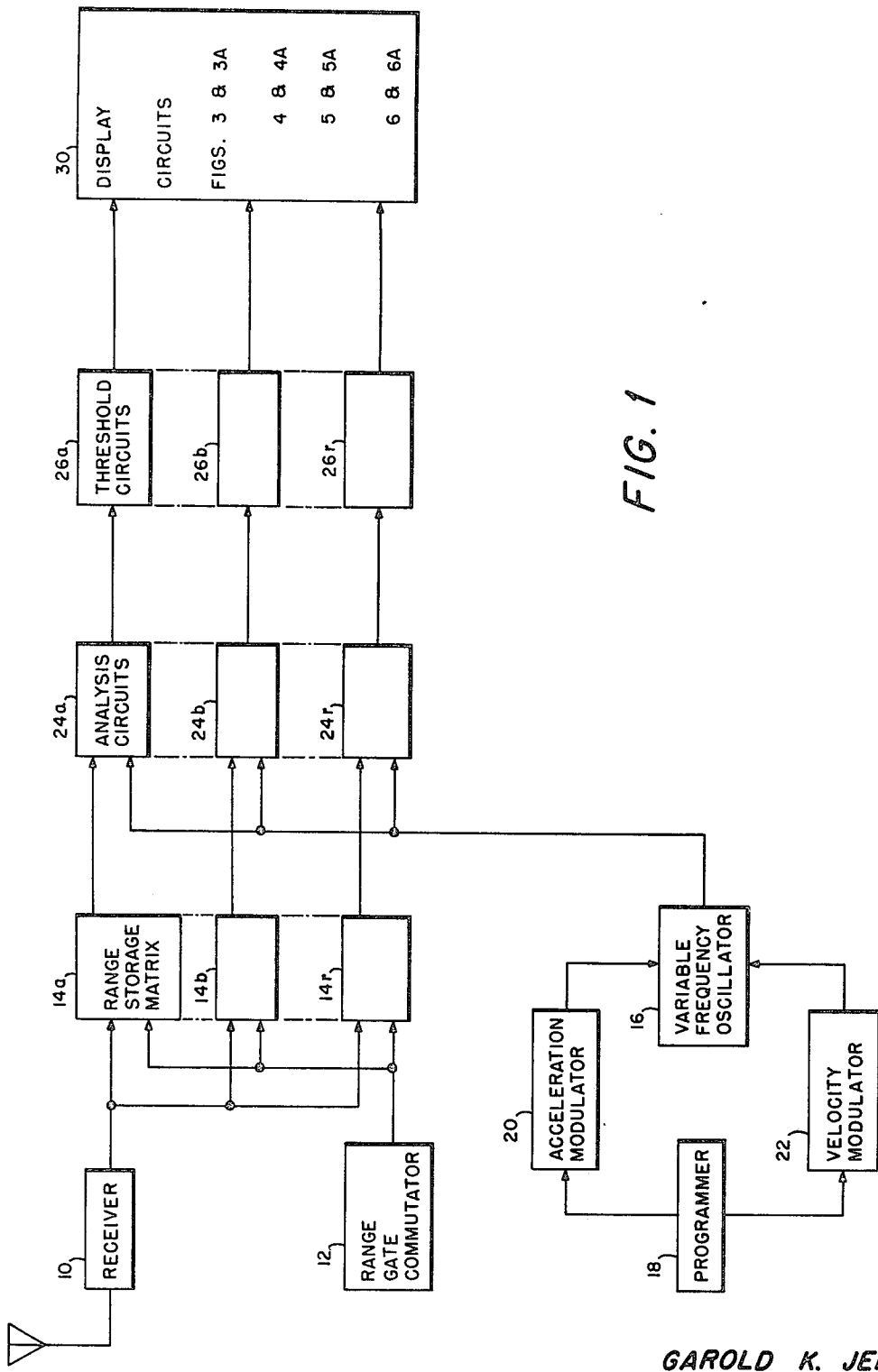
FIG. 1 is a block diagram of a radar including the invention.

Referring now to the drawings, wherein like reference characters designate like or corresponding parts throughout the several views, there is shown in FIG. 1 (which illustrates a preferred embodiment) a radar receiver 10 which, per se, is not a part of the invention and is therefore not described in explicit detail. The reader will recognize that receiver 10 has the customary local oscillators and mixers and that since the transmitted radar pulses are relatively short when compared with a cycle of doppler frequency, it is necessary to mix the local frequency with a succession of returned signals and maintain the local frequency coherent in phase with respect to the originally transmitted frequency. Further, as is well known, the output of the mixing process is filtered to obtain a series of bipolar video pulses whose amplitude envelope contains the doppler information. This bipolar video signal, which is the output of receiver 10 as illustrated in FIG. 1, is sampled at a plurality of intervals corresponding to range gates and distributed by range gate commutator 12 to the appropriate range gate storage, which preferably are in the form of storage matrices 14a, 14b .... 14r. Each of these storage matrices may be a plurality of capacitors which are successively gated so that a given storage matrix will store a plurality of sequential video signals corresponding to a given range gate. When these capacitors are then read out in rapid succession, the amplitude envelope of the resulting signals will contain the doppler frequency multiplied by the ratio of the writein time over the readout time.

Variable frequency oscillator 16, which is controlled by programmer 18, acceleration modulator 20 and velocity modulator 22, is connected to analysis circuits 24a, 24b .... 24r. As described more fully in copending patent application, Ser. No. 476,782 filed July 29, 1965 by Garold K. Jensen for INFORMATION DISPLAY SYSTEM HAVING MAIN AND AUXILIARY SWEEPS, the modulators 20 and 22 change the frequency of oscillator 16 in a number of predetermined patterns which are intended to duplicate the doppler frequency (target velocity characteristic) and the doppler frequency variation (target acceleration characteristic) of the signal readout from storage matrices 14a, 14b...14r. When this circumstance occurs, the analysis circuits 24a, 24b ... 24r, which are also described in the above-mentioned application, Ser. No. 476,782, produce a signal which is above the threshold set into threshold circuits 26a, 26b ... 26r. These circuits thereupon produce an output of a predetermined amplitude and duration. When no match is achieved between the signals from storage matrices 14a, 14b ... 14r and the signal from oscillator 16, the noise output from analysis circuits 24a, 24b ... 24r is below the threshold of circuits 26a, 26b ... 26r which then produce no signal. The outputs of threshold circuits 26a, 26b ... 26r are connected to the display circuitry 30 which is subseqnently described in detail in relation to FIGS. 3 and 3A, 4 and 4A, 5 and 5A and 6 and 6A.

FIG. 2 is a schematic explanation of the output signals for a full analysis period of the oscillator 16 and of one of the threshold circuits 26a, 26b ... 26n, say for example 26a. During the portion of the time period for positive accelerations marked $V_1$, from $+A_1$ to $+A_{n/2}$, the output of velocity modulator 22 remains constant while the acceleration modulator 20 sweeps oscillator 16 through frequency patterns representative of different positive target accelerations. This technique is repeated for various values of velocity $V_2$ ... $V_n$ and then for the velocities grouped with negative acceleration patterns. As shown in FIG. 2, a target is indicated (by the pulse of predetermined amplitude and duration) in the range associated with storage matrix 14a and threshold circuit 26a and having a velocity $V_2$ and an acceleration pattern $A_3$. During the remainder of the analysis period the output of the threshold circuit 26a is a zero, i.e., the noise from analysis circuit 24a has been blocked by threshold circuit 26a.

Figure 3A:
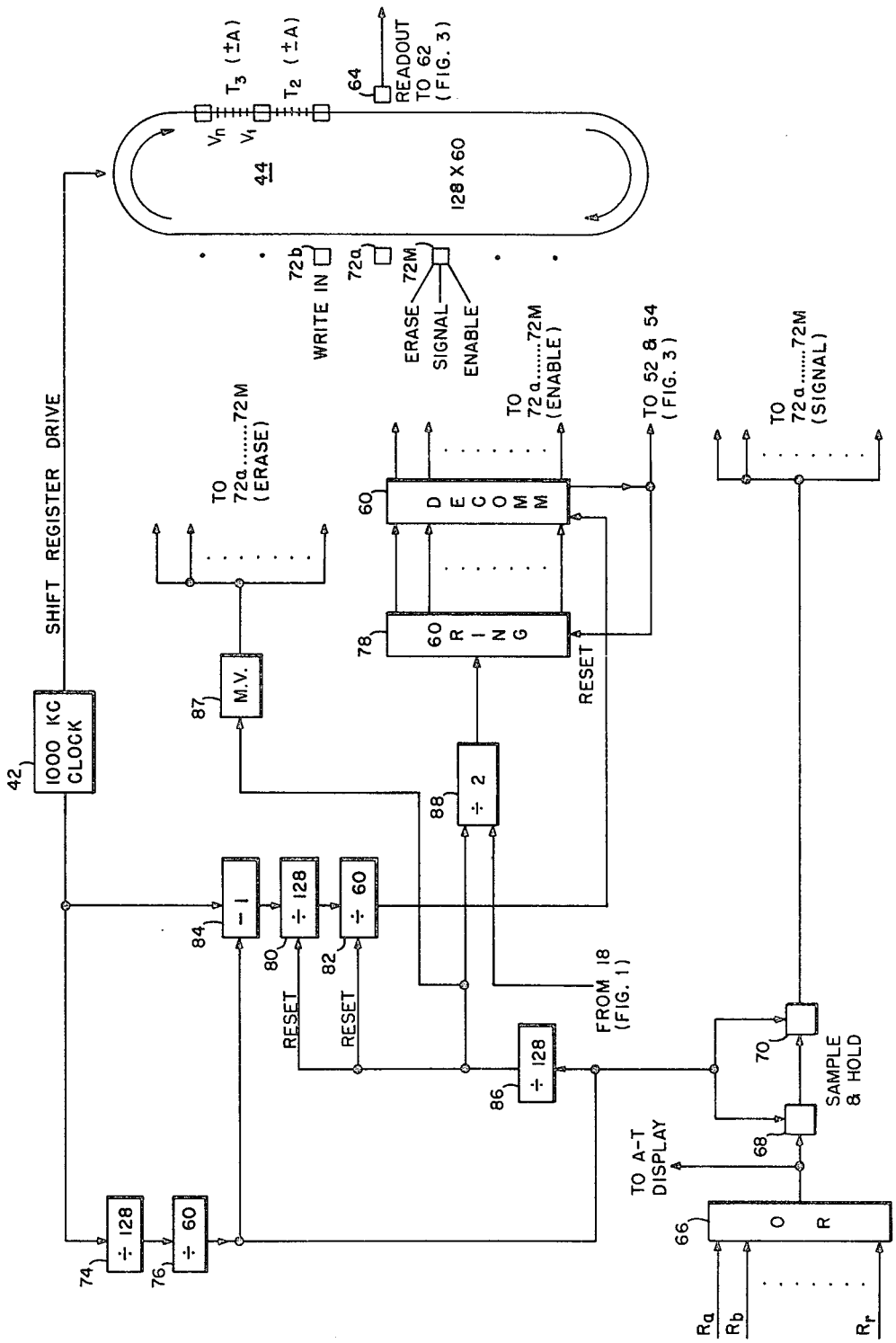

FIGS. 3 and 3A illustrate the portion of display 30 which relates velocity and time. This display (V-T) will be described as presenting 60 analysis periods of 128 different velocities (bins), corresponding to $n=128$ in FIG. 2. The reader will realize that these numerical capacities are for the purpose of description and that obviously other capacities can be used.

As will be described subsequently in more detail, the circuitry of FIGS. 3 and 3A functions to present information on the face of a cathode ray tube in the form of 128 velocities arranged vertically for each of 60 separate analysis periods, the newest of which is added on the right edge of the time (horizontal) scale from where it progresses to the left to eventually "drop out" from the left hand edge. The input for the display tube is obtained from a clock driven dynamic shift register connected in a loop, such as a multiple of type MEM 3064 manufactured by General Instrument Corp., which contains a capacity of $128 \times 60 = 7680$ bits. Target indication for both positive and negative acceleration are written into the same storage bit by a writein procedure that sequentially utilizes 60 writein stations to erase the oldest information while storing the newest information in its place.

Referring now to FIG. 3, the V-T display appears on the face of cathode ray tube (CRT) 40 which has the conventional three input controls X, Y and Z (intensity) which are respectively representative of time, velocity and target indication.

The time (X) and velocity (Y) sweeps of CRT 40 are coordinated by a 1000 KC clock 42 which also drives and coordinates the information storage in the $128 \times 60$ bit shift register 44 (FIG. 3A). Clock 42 is preferably included in the programmer 18 in FIG. 1. Velocity (Y) sweep generator 46 is controlled by counter 48 to perform one vertical sweep for every 128 counts of clock 42, i.e., each vertical sweep displays all 128 velocity bins.

Time (X) sweep generator 50 is controlled by counters 52 and 54 and by counters 48 and 56 which control the inhibit or subtract device 58. Counters 52 and 54 cause the horizontal sweep to be such that 60 analysis periods of the 128 velocity bins are shown. The counters 48 and 56 control subtract device 58 to extend every other period of the horizontal sweep generator 50, thereby causing new information to be added to the right side of the display, i.e., displayed information constantly moves leftward until it disappears. Counters 52 and 54 are reset or synchronized by a pulse from switching device or decommutator 60 on each occasion that all $128 \times 60$ bits of shift register 44 have ben rewritten.

Blanking of the trace, i.e., inhibiting the Z input of CRT 40 during flyback, is provided by connecting blanking gate 62 to the outputs of counters 48 and 54.

FIG. 3A illustrates the circuitry for processing and transferring the information from threshold devices 26a, 26b ... 26n (FIG. 1) to the intensity (Z) input of CRT 40.

The parallel range outputs from the threshold circuits 26a, 26b ... 26r, are all connected to OR gate 66. As was discussed in relation to FIGS. 1 and 2, the outputs of the thresholds will be zero except for very rare pulses of uniform amplitude and duration. These pulses occur whenever the signals from the variable oscillator 16 match the velocity and acceleration characteristics in the doppler frequency of the target reflections received by receiver 10. As pointed out in connection with FIG. 2, such a match can occur at any time during the analysis period.

OR gate 66, in addition to being connected to the A-T portion of display 30 for purposes which will be later described, is connected to sample and hold devices 68 and 70 which are in turn connected to the signal leads of writein devices 72a, 72b ... 72M of shift register 44, where M is equal to the number of analysis periods to be stored, i.e., in terms of the numerical capacity assumed M = 60.

As shown with writein device 72M, each of the writein devices 72 has three control leads (enable, signal and erase) and functions in a manner well known in commercially available recording heads. Specifically the devices 72 function to writein a signal on the signal lead only when energized by a pulse on the enabling lead. Erasure prior to writein (sometimes called rewrite) occurs if a signal is present in the erase lead. In the absence of such a signal on the erase lead, no erasure occurs prior to writein, or as the process is sometimes called, overwrite.

The operation of shift register 44, which is driven by 1000 KC clock 42, and of the variable frequency oscillator 16 which is controlled by programmer 18 (the programmer may also include the clock) is coordinated so that the shift register 44 is driven through one revolution, i.e., $128 \times 60$ counts of clock 42 in the same time that is used for an analysis of a velocity bin for either positive or negative accelerations.

Sample and hold devices 68 and 70 are also coordinated with the operation of the shift register 44 by means of counters 74 and 76 which reset the devices 68 and 70 once for every revolution of shift register 44. Sample and hold device 68, which can receive a target indication at any time during the velocity bin analysis, holds this signal until it receives a pulse from counter 76. This pulse causes the transfer of the signal from device 68 to device 70, from where the signal is available for writein by the devices 72. In other words the device 68 samples all of the acceleration bins in a certain velocity for all ranges (by OR gate 66) and remains zero unless one or more signals are present, in which event the device 68 sets at one until the arrival of a pulse from counter 76. This pulse, which occurs at the end of the velocity bin analysis, concurrently causes device 70 to erase any signal therein and then to sample the device 68 and assume the value which is in the device 68 and to then cause the device 68 to reset to zero. Device 70 holds at either the zero or one value obtained from device 68 until the next reset pulse from counter 76, during which time the held signal is available for writein by heads 72. As will be explained in the next paragraph, only one of the writein devices 72 is enabled to actually writein the target indication into shift register 44.

the writein devices 72a, 72b ... 72M each are connected, as already described to the sample and hold device 70 and also to the separate enabling outputs of decommutator 60, which is controlled by a ring-of-60 counter 78. The enabling pulse is produced by counters 80 and 82 and by counters 74 and 76 which control the inhibit or subtract device 84. Because of the subtraction by device 84, which occurs once every revolution of shift register 44, the enabling pulse produced by counter 82 and transferred to a single writein device 72 by the decommutator 60, causes the point of writein to retrogress one bit per loop cycle, and thereby avoid the overwriting of adjacent velocity bins.

Counter 86 is connected to counter 76 and produces a pulse which resets counters 80 and 82 upon the completion of the readin of 128 velocity bins, i.e., after each half of a full analysis period (FIG. 2). The signal from counter 86 controls bistable multivibrator 87 which is connected to the erase leads of the writein devices 72 and functions to cause these device to rewrite (erase then writein) during the analysis of velocity bins having positive acceleration bins and to overwrite during the analysis of velocity bins having negative acceleration bins. The output of counter 86 is also connected through counter 88 to shift ring counter 78 upon the completion of 256 velocity bins. Counter 88 is programmed, by inserting a count at the start of operation, to shift ring 78 at the time of each change between positive and negative acceleration bins. This causes the position where writein occurs to advance, for example from writein position 72a to 72b, and thereby allows overwriting of outputs from negative accelerations over those previously recorded for positive accelerations. Upon completion of the readin of the sixtieth analysis period, the decommutator 60 resets ring 78 and counters 52 and 54 (FIG. 3).

By now the operation of the circuitry shown in FIGS. 3 and 3A is, no doubt, apparent. The range bin analysis signals $R_a$, $R_b$, ... $R_r$ from threshold devices 26 are collapsed by OR gate 66 and sample and hold devices 68 and 70 to contain nothing but sequential velocity bin readout information. However, because of the use of threshold devices 26a, 26b ... 26r, no collapsing losses (noise buildup) occurs as would normally happen. The sequential velocity information is written into shift register 44 under the control of the counter chains and decommutator 60 so that the point of writein retrogresses one shift register bit per velocity bin, i.e. per revolution of shift register 44, until the acceleration analysis changes from positive to negative, whereupon the point of writein is advanced to the next station 72a, 72b ... 72M by a shift of the enable signal by decommutator 60. When the acceleration analysis changes from negative to positive, and all during such positive acceleration analysis the multivibrator 87 controls the heads 72 to operate in the rewrite mode, i.e., erase then writein, thereby erasing old information from a full shift register.

The readout by sensor 64 of the information stored in shift register 44 is connected to the intensity grid of CRT 40, the X and Y sweeps of which are controlled to show the 128 velocity bin readout (Y sweep) over 60 analysis periods spread horizontally (X sweep). The entire pattern, wherein target indications appear as bright, spots, slowly moves leftward, new information being added on the right and older information disappearing from the left of the display on CRT 40.

Figure 4:
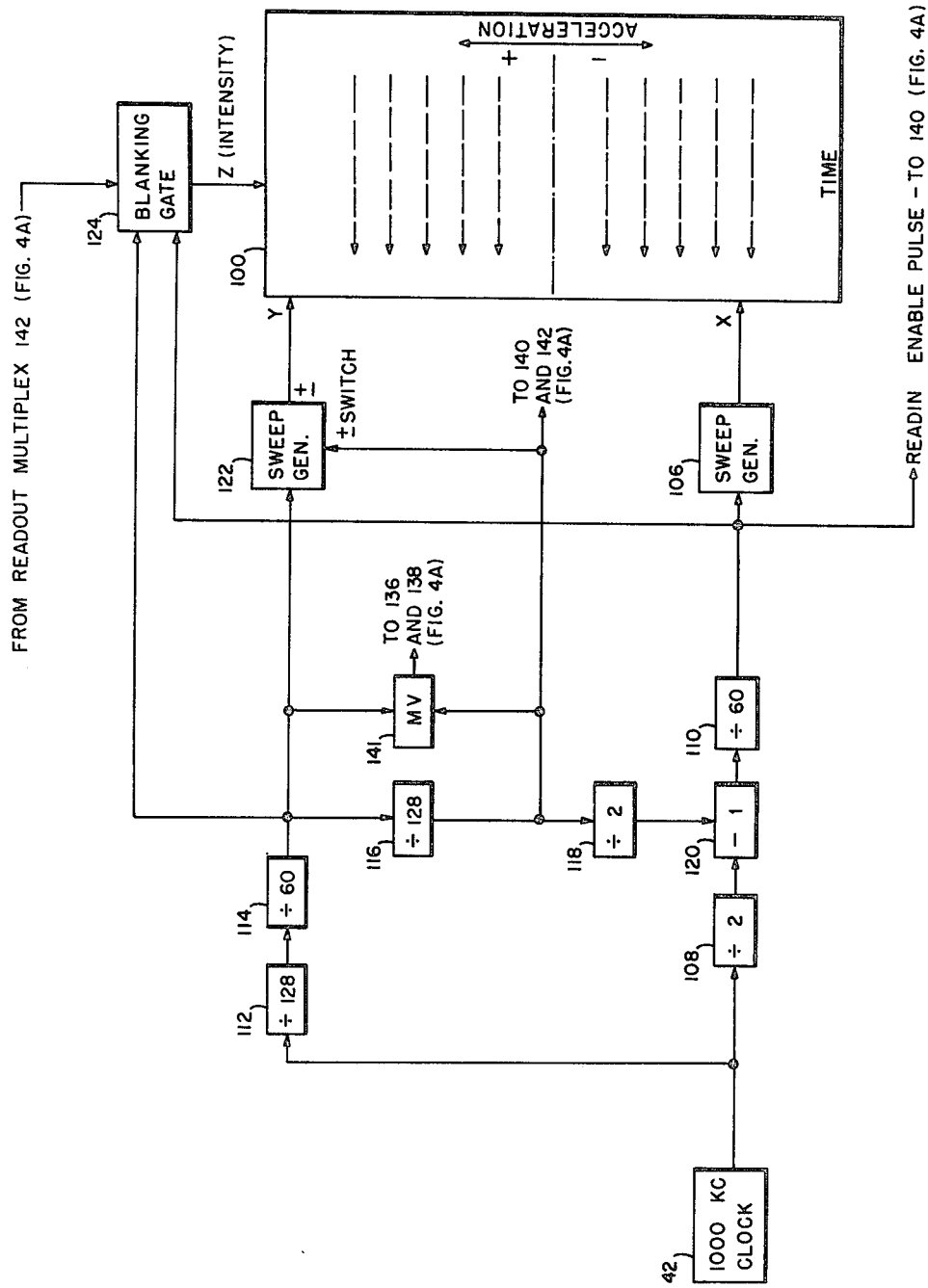

FIGS. 4 and 4A illustrate the portion of display 30 which relates acceleration and time. This display (A-T) will be described as presenting 60 analysis periods of 128 different accelerations (bins) of which 64 are positive and 64 are negative accelerations, i.e., $n/2 = 64$ in FIG. 2. Of course, the reader should continue to realize that, as in the case of the previous velocity display description, these numerical capacities are for the purpose of description and that obviously other capacities can be used.

As will be described subsequently in more detail, the circuitry of FIGS. 4 and 4A function to present information on the face of a cathode ray tube in the form of 64 positive accelerations arranged progressively upward and 64 negative accelerations arranged progressively downward for each of 60 separate analysis periods, the newest of which is added on the right edge of the time (horizontal) scale from where it progresses to the left to eventually "drop out" from the left edge. The input for the display tube is obtained from two shift registers, each of which contains a capacity of $64 \times 60 = 3840$ bits. These shift registers are alternately connected to the intensity (Z) grid of the CRT. Target indications for the same acceleration for all 128 velocity bins are written into the same storage bit by a writein procedure which involves a one-bit retrogression after each full analysis period whereby oldest information is erased and the newest information is stored in its place.

Referring now to FIG. 4, the A-T display appears on the face of CRT 100 which has the conventional X, Y, Z inputs which are respectively representative of time, acceleration and target indication.

The time (X) and acceleration (Y) sweeps of CRT 100 are coordinated, in a manner similar to that shown in FIG. 3 with CRT 40, by the 1000 KC clock 42 which also drives and coordinates the information storage and readout of the two $64 \times 60$ bit shift registers 102 and 104 (FIG. 4A).

Time (X) sweep generator 106 is controlled by counters 108 and 110 and by counters 112, 114, 116 and 118 which control the inhibit or subtract device 120. The period of acceleration (Y) sweep generator 122 is controlled by counters 112 and 114 and the polarity of this generator is changed by the counters 112, 114 and 116.

Blanking of the trace, i.e., inhibiting the Z input of CRT 100 during flyback, is provided by connecting blanking gate 124 to the outputs of counters 110 and 114.

In reading this specification, it will doubtlessly occur to the reader that the outputs of various counters may be used for a multiplicity of purposes and other counters eliminated. For example, the outputs of counters 48 (FIG. 3), 74 (FIG. 3A) and 112 (FIG. 4) are identical. In the actual constructuion of the invention, efficient use of components is of course contemplated. However, it is believed that herein the aims of cohesion and clarity of description is sometimes best served by the descriptive use of separate, though identical, counters and counting chains in the various figures.

FIG. 4A illustrates the circuitry for processing and transferring the information from the threshold devices 26a, 26b ... 26r (FIG. 1) to the intensity (Z) input of CRT 100.

As previously discussed in describing FIG. 3A, the parallel range outputs from the threshold circuits 26a, 26b ... 26r are all connected to OR gate 66 and are zero except for very rare pulses of uniform amplitude and duration which are indicative of a target and can occur at any time as a result of the doppler frequency characteristics of the target reflections being matched by the variable frequency oscillator 16 of FIG. 1.

OR gate 66 is connected to sample and hold devices 130 and 132 which are controlled by counter 134 and function in a manner very similar to the devices 68 and 70 of FIG. 3A., i.e., device 130, which can receive a signal at any time, holds this signal until energized by counter 134 to transfer the signal to device 132 where it is available for writing into the shift registers 102 and 104 until it is erased by the next pulse by the counter 134.

The writein of signals from sample and hold device 132 is either through head 136 into shift register 102 or through head 138 into shift register 104. These heads are very similar to the heads 72 already described in relation to FIG. 3A. However, in addition to the enable, signal and erase leads, heads 136 and 138 also include an output (readout) lead. Enabling pulses from counter 110 (FIG. 4) are directed to one or the other of heads 136 or 138 by decommutator 140 which is in turn controlled by pulses from counter 116 (FIG. 4). Erase pulses for heads 136 and 138 originate in bistable multivibrator 141 (FIG. 4) which is turned on by a pulse from counter 116 and is turned off by the next pulse from counter 114, i.e. the erase pulses occur only during the positive and negative acceleration analysis of velocity bins $V_1$ (FIG. 2). The pulses from counter 116 also control the multiplexer 142 which alternately connects the readout leads from heads 136 and 138 to the Z input of CRT 100.

Shift registers 102 and 104 are driven by clock 42 through counter 144 at the same revolution rate as the register 44 in FIG. 3A, i.e., the clock frequency is halved by counter 144 since the shift registers 102 and 104 each have only half the number of bits contained in register 44.

To summarize the operation of the circuitry of FIGS. 4 and 4A, the range bin analysis signals $R_a$, $R_b$ ... $R_r$ from the threshold devices 26a, 26b ... 26r are collapsed by OR gate 66 and sample and hold devices 130 and 132. As previously described the threshold devices allow the collapsing without the introduction of the usual collapsing (noise buildup) losses.

The output of sample and hold device 132 is read into the shift registers 102 and 104 in such a way that the signals in the 64 positive acceleration bins in velocity bin $V_1$ (FIG. 2) are spaced uniformly about shift register 102. Because of the erase signal from multivibrator 141, the writein from velocity bin $V_1$ is preceded by erasure, i.e., older information is erased before newer information is added. A similarly spaced readin, without erasure, is repeated for each of the other 127 velocity bins for positive accelerations, i.e., each of the 64 bis written in for bin $V_1$ are overwritten 127 times. The negative acceleration half of the analysis (FIG. 2) is then similarly read into the shift register 104. Upon completion of 128 writeins to each of the 64 bits of the shift register 104, the writein is switched (by decommutator 140) back to shift register 102 with a retrogression of one bit caused by subtract device 120.

Readout through multiplexer 142 is alternated between the shift registers 102 and 104 in synchronism with the alternating of the polarity of sweep generator 122. Because of the effect of subtract device 120 the entire pattern of both positive (upward) accelerations and negative (downward) accelerations gradually moves leftward, the newer information being added on the right and the older information disappearing from the left of the display on CRT 100. Target indications, of course, appear as bright dots in the moving pattern.

Figure 5A:
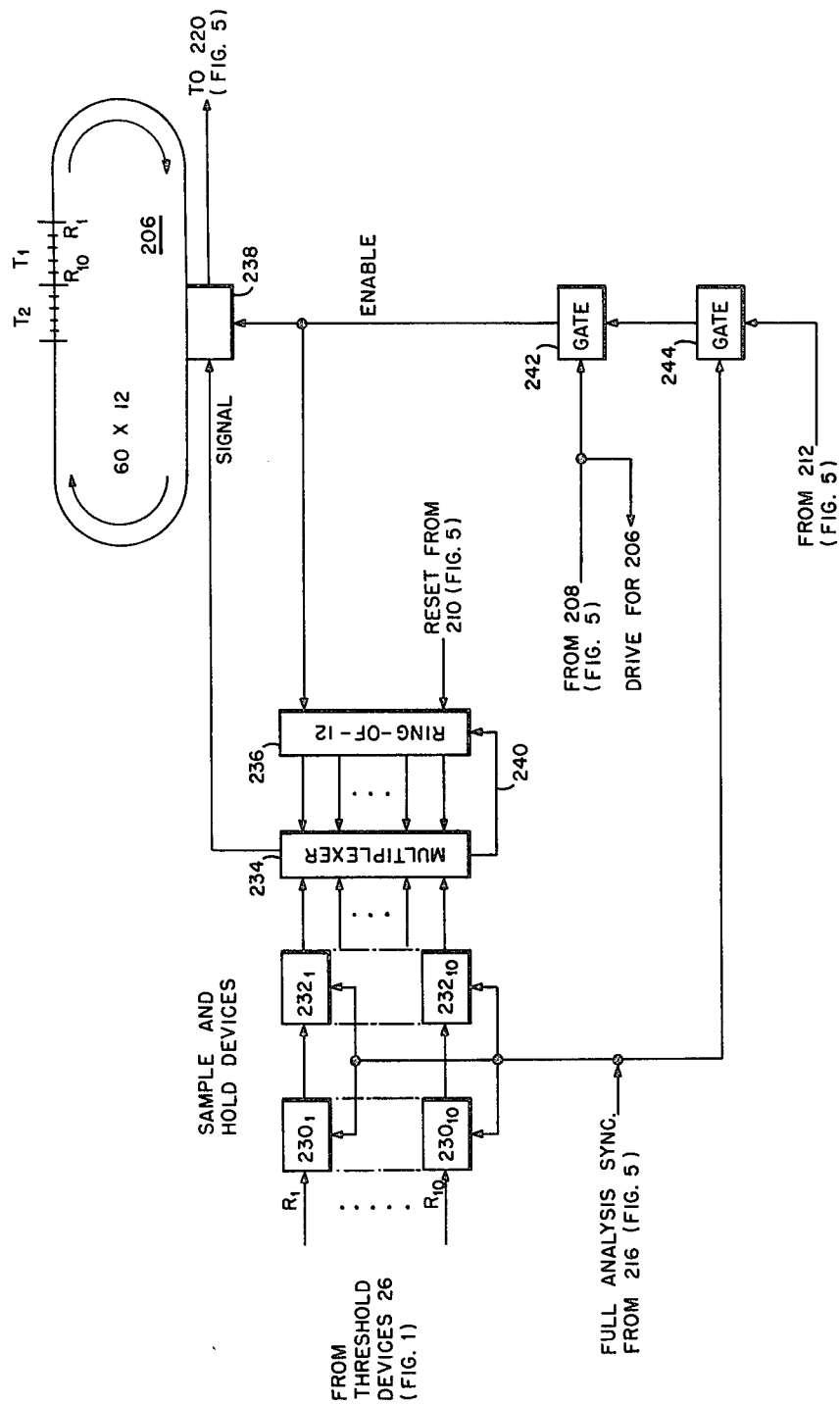

FIGS. 5 and 5A illustrate the portion of display 30 which relates range and time. This display (R-T) will be described as presenting 60 analysis periods of 10 different ranges (bins), i.e., $r = 10$ in FIG. 1. As pointed out before, the reader should realize that numerical capacities are for the purpose of description and that obviously other capacities can be used.

The circuitry of FIGS. 5 and 5A functions to present information on the face of a CRT in the form of 10 ranges arranged vertically for each of 60 separate analysis periods, the newest of which is added on the right edge of the time (horizontal) scale from where it progresses to the left to eventually "drop out" from the left edge. The input for the display tube is obtained from a clock driven dynamic shift register which contains a capacity of 12 ×60 bits, i.e. the shift register has a capacity for 12 ranges, only 10 of which are described as being used. Target indications, for all velocities and accelerations, which occur in a range, are written into the shift register by a procedure whereby the first 60 analysis periods (time bins) are uniformly spaced around the shift register and thereafter newer information is read in as the older information is erased.

Referring now to FIG. 5, the R-T display appears on the face of CRT 200 which has the conventional three input controls X, Y and Z (intensity) which are respectively representative of time, range and target indication. As in the previously described circuitry, the time (X) and range (Y) sweep generators 202 and 204, respectively, and the drive of the shift register 206 (FIG. 5A) are coordinated by the 1000 KC clock 42. Because of the limited capacity of the 12 × 60 shift register 206, it is convenient to reduce the frequency of the clock 42 by the counter 208.

In addition to counter 208, the range sweep generator 204 is also controlled by counter 210. The time sweep generator 202 is controlled, as shown, by the counters 208, 210 and 212 and by counters 214 and 216 that control the inhibit or subtract device 218. Blanking of the trace, i.e., inhibiting the Z input of CRT 200 during flyback, is provided by connecting blanking gate 220 to the outputs of counter 210 and 212.

FIG. 5A illustrates the circuitry for processing and transferring the information from the threshold devices $26a, 26b, ... 26r$ (FIG. 1) to the intensity (Z) input of CRT 200.

As previously mentioned, for purposes of description, ten range bins will be assumed, i.e., $r = 10$ in FIG. 1. The range bin signals from the threshold devices 26 of FIG. 1 are connected to sample and hold devices $230_1...230_{10}$ and $232_1...232_{10}$, each pair of which function in a manner which is by now familiar to the reader. One of the first sample and hold devices $230_1...230_{10}$ retains the pulse, which is indicative of the target and which can occur at any time, until energized by the full analysis period sync signal from counter 216 (FIG. 5) whereupon the signal is transferred to the associated sample and hold device $232_1...232_{10}$ where it is available for writing into the shift register 206 until it is erased by the next full analysis period sync signal. The reader will also understand by now that, because of the use of the threshold devices 26, the normal noise buildup (collapsing loss due to the retention of returns in a range for all velocities and accelerations) will not occur.

Although only 10 bins have been assumed, the reader will realize that 50, 100 or more range bins may be used as desired. It may sometimes be convenient, for example to obtain desirable time relationships between the various displays, to design the shift register and associated circuitry with a capacity in excess of the number of range bins used. Herein, although 10 range bins are assumed, a capacity of 12 range bins is included in the $60 \times 12$ shift register 206 and associated writein apparatus, i.e. multiplexer 234 and ring switch 236.

The writein of signals into shift register 206 is by the now familiar procedure whereby 60 analysis periods are sequentially placed in the shift register storage and thereafter the oldest information is erased as newer information is added. Signals from the sample and hold devices $232_1...232_{10}$ are written into shift register 206 through head 238 which has the conventional signal, enable and output leads. The erase lead, which is not shown, is always energized so that erasure preceeds writein. The signal lead of head 238 is sequentially connected to the sample and hold devices $232_1...232_{10}$ by multiplexer 234 which is controlled by ring-of-12 switch 236. After writing in the signals from sample and hold devices $232_1...232_{10}$, the multiplexer 234 transmits, via lead 240, a reentry pulse to switch 236 which, after a reset pulse is received from counter 210, permits another readin from the sample and hold devices 232. All readins are, of course, under the control of enabling pulses which are received through gate 242. This gate is opened by gate 244 upon receiving a full analysis period sync pulse (which also shifts the signals in the sample and hold devices 230 and 232) and then a pulse from counter 212. Gate 242 is self closing at a time shortly after the passing of 12 enabling pulses. Because of inhibit or subtract device 218, the write into shift register 206 retrogresses 12 bits for each full analysis period, thereby preventing overwriting.

As the reader by now understands, the operation of the portion of the invention illustrated in FIGS. 5 and 5A is such that all of the radar receiver signals are grouped solely according to range (i.e., without regard to velocity or acceleration) and without the usual collapsing losses (noise buildup) because of the binary operation of the thresholds 26 (FIG. 1). The range signals for full analysis periods are processed and written into storage 206 by sample and hold devices 230 and 232 and by multiplexer 234 and ring switch 236 in such a manner that range signals for sequential analysis periods are sequentially placed into the $60 \times 12$ bit storage 206 until the storage is full, whereup the older information is erased as newer information is added. This writein procedure requires a 12 bit retrogression per analysis period which is accomplished primarily by gating 242 and 244 and by the operation of inhibit or subtract device 218. This latter device also causes the display of the storage readout (vertically arranged range signals for 60 analysis or time periods which are spread horizontally) to move slowly leftward, i.e., newer information appearing on the right side of the CRT display and moving leftward until disappearing from the left side of the display.

Figure 6A:
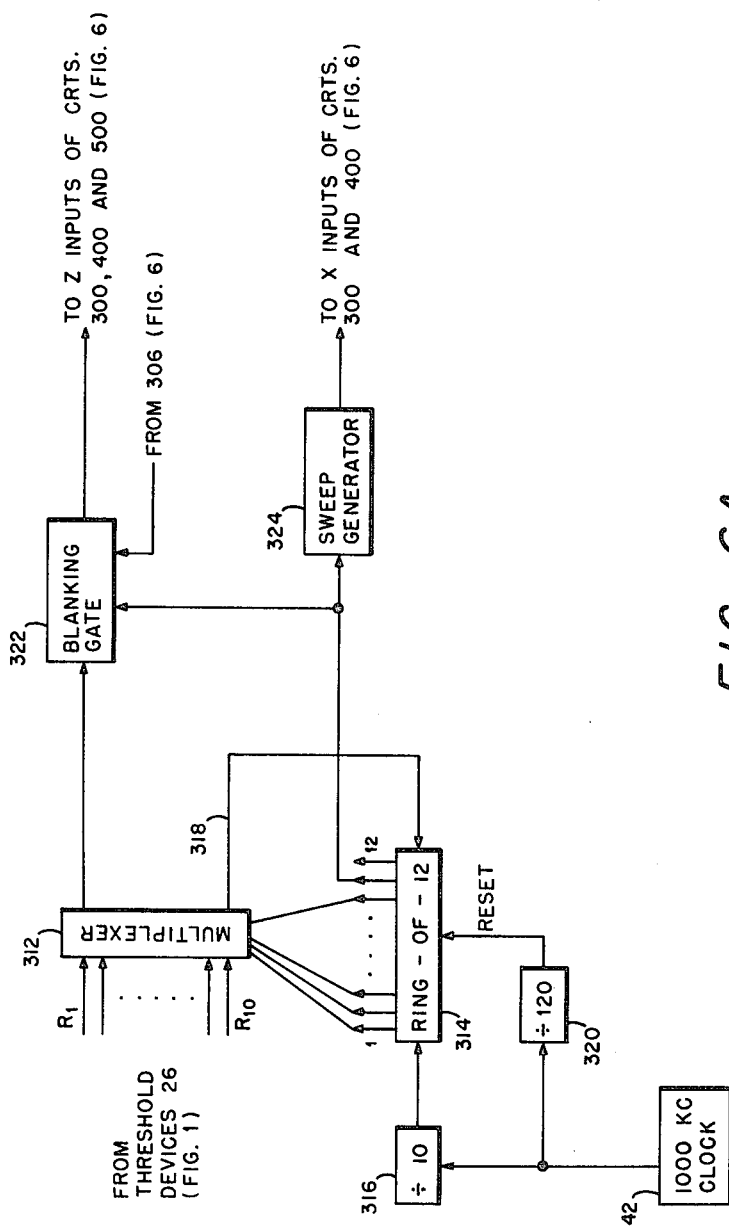

FIGS. 6 and 6A illustrate the portion of display 30 which relate range, velocity and acceleration during a single analysis period. Since these (V-R, A-R and A-V) displays are for a single analysis period, no data storage provisions, such as the previously described shift registers, are required.

In FIG. 6 there is illustrated three CRTs, 300, 400 and 500, each of which the conventional three X, Y and Z (intensity) controls. As shown, the V-R display appears on the face of CRT 300, the A-R display appears on the face of CRT 400 and the A-V display appears on the face of CRT 500. These displays are coordinated by the 1000 KC clock 42. In describing the V-R, A-R and A-V displays the numerical capacities of 10 range (bins), 128 velocities (bins) and 64 positive and 64 negative accelerations (bins) will continue to be assumed although obviously other capacities can be used in any actual construction of the invention.

The sweep generator 302 for the Y (acceleration) inputs for CRTs 400 and 500 is controlled by counters 304 and 306 to make one sweep for each velocity bin $V_1...V_n = 128$ (FIG. 2) and by counter 308 which changes the polarity of sweep after every 128 sweeps, i.e., when the acceleration bins of FIG. 2 change polarity. Counters 304, 306 and 308 also control the sweep generator 310 for the velocity (Y) input of CRT 300 and for the X input of CRT 500.

FIG. 6A shows the circuitry which provides the Z (intensity) inputs for CRTs 300, 400 and 500 and the range (X) inputs of CRTs 300 and 400.

The range bin signals $R_1...R_{10}$ from thresholds 26 are connected to multiplexer 312 which is controlled by ring-of-12 switch 314. Switch 314 is in turn controlled by counter 316 and is set by a combination of the reentry pulse from multiplexer 312 via lead 318 and a reset pulse from counter 320. The reader will recognize that the reset pulse coincides with the acceleration bin sync signal and that each of the range bins $R_1...R_{10}$ are sampled by multiplexer 312 during each acceleration bin period. The output of multiplexer 312 is connected to the Z (intensity) inputs of CRTs 300, 400 and 500 through a blanking gate 322 that inhibits the Z signal during the various CRT flybacks and is controlled by counter 306 and the range sync signal that is obtained from the eleventh position of switch 314. This latter signal also controls the range sweep generator 324 which is connected to the X inputs of CRTs 300 and 400 (FIG. 6).

The operation of FIGS. 6 and 6A can, perhaps, be best summarized in the form of functional descriptions of the displays. In CRTs 300 and 400 the horizontal (range) sweep is very rapid and presents horizontally the ten range bin samples (taken by multiplexer 312) from each acceleration bin. In CRT 300 the vertical velocity sweep occurs twice for each full analysis period, i.e. for the positive acceleration half and for the negative acceleration half of FIG. 2. As a result of such sweeps, target information is presented by range and velocity and without regard to direction or magnitude of acceleration and also without collapsing loss due to the now familar functioning of the threshold devices 26 (FIG. 1).

In CRT 400 the vertical (acceleration) sweeps occur once for every velocity bin of FIG. 2. The direction of the sweeps also change, being upward from the middle of the display for the positive acceleration velocity bins (left half of FIG. 2) and downward for the negative acceleration velocity bins. As a result of such sweeps, target information is presented by CRT 400 by range and by the direction and magnitude of acceleration but without regard to velocity.

The horizontal (velocity) sweep for CRT 500 is the same as the vertical sweep of CRT 300, i.e., occurs twice for each full analysis period. The vertical (acceleration) sweep for CRT 500 is the same as the vertical sweep of CRT 400 and occurs once for every velocity bin and changes in direction according to whether the velocity bin contains positive or negative acceleration. As a result of these sweeps, target information is presented by CRT 500 by velocity and by the direction and magnitude of acceleration but without regard to range.

There has been disclosed an invention which provides an improved display system for radar wherein multi-parameter information is presented in a plurality of two dimensional displays and wherein collapsing losses are minimized by the use of threshold devices. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A radar receiver and display system comprising:
    receiver means for receiving energy reflections from a target and producing a signal containing doppler frequencies which characterize the velocity and acceleration of said target;
    analysis means, connected to said receiver means and including a variable frequency oscillator, for producing an output signal which normally includes only noise but producing an output signal above a predetermined threshold whenever the frequency of said variable frequency oscillator is caused to match the doppler frequencies of said receiver means signal;
    threshold means connected to said analysis means and functioning to produce a signal of predetermined amplitude and duration whenever said analysis means output signal is above said predetermined threshold and at other times is substantially zero and
    display means connected to said threshold means to present indications representative of differing parameters of said target.

2. The radar receiver and display system of claim 1 wherein said display means includes a plurality of cathode ray tubes which present on the face thereof indications of the range, acceleration and velocity of said target.

3. The radar receiver and display system of claim 2 wherein said analysis means includes a clock for coordinating said indications on the faces of said cathode ray tubes and the variations of said variable frequency oscillator.

4. A radar receiver and display system comprising:
    receiver means for receiving energy reflections from a target and producing a signal containing doppler frequencies which characterize the velocity and acceleration of said target;
    range storage means including a plurality of storage devices and a commutator which individually and sequentially connects said storage devices to said receiver means;
    programmer means, including a clock, for coordinating the operation of various parts of said radar receiver and display system;
    a variable frequency oscillator;
    modulator means connected to said programmer means and functioning to control said variable frequency oscillator to sequentially produce during an analysis period of predetermined length a plurality of frequency patterns which are similar to the doppler frequencies which would be produced in said receiver means signal for targets of a predetermined nature;
    analysis means connected to said range storage means and to said variable frequency oscillator and functioning to produce a signal above a predetermined threshold whenever the frequency of said variable frequency oscillator matches the doppler frequencies of said receiver means signal;
    threshold means connected to said analysis means and functioning to produce a signal of predetermined amplitude and duration whenever said analysis means output signal is above said predetermined threshold and at other times is substantially zero and
    display means connected to said threshold means to present indications representative of differing parameters of said target, said indications being substantially free of the normal collapsing losses because of the manner of functioning of said threshold means.

5. The radar receiver and display system of claim 4 wherein said display means includes a plurality of cathode ray tubes which present on the face thereof indications of the range, acceleration and velocity of said target.

6. The radar receiver and display system of claim 5 wherein said display means includes:
    a Velocity-Time cathode ray tube having horizontal and vertical sweep and intensity control inputs;
    velocity display storage means having a capacity to store signals for a predetermined number of analysis periods and connected to said threshold means and driven by said clock in such a way that signals from said threshold means are stored in a sequence representative of the velocity of a target and when said velocity display storage means has been filled by signals from said predetermined number of analysis periods, the signals from the oldest analysis periods are erased as newer signal are added and velocity display circuit means connecting the readout of said velocity display storage means to said intensity control input of said Velocity-Time cathode ray tube and connecting said clock to said horizontal and vertical sweep inputs of said Velocity-Time cathode ray tube in such a way that threshold signals stored in said velocity display storage means appear as bright spots which are positioned in one display dimension to be representative of target velocity and which in the other display dimension move from one side to the other of the display before disappearing.

7. The radar receiver and display system of claim 6 wherein the connection between said velocity display storage means and said threshold means includes an OR gate.

8. The radar receiver and display system of claim 7 wherein said display means includes:

an Accleration-Time cathode ray tube having horizontal and vertical sweep and intensity control inputs;

first and second acceleration display storage means, each having a capacity to store signals for a predetermined number of analysis periods, said first acceleration display storage means being connected to said threshold means during the first half of said analysis period and said second acceleration display storage means being connected to said threshold means during the second half of said analysis period, said first and second acceleration display storage means being driven by said clock in such a way that signals from said threshold means are stored in a sequence representative of the acceleration of a target, positive acceleration signals being stored in said first acceleration display storage means and negative acceleration signals being stored in said second acceleration display storage means, and in such a way that when said first and second acceleration display storage means have been filled by signals from said predetermined number of analysis periods, the signals from the oldest analysis periods are erased as newer signals are added and acceleration display circuit means connecting the readouts of said first and second acceleration display storage means to said intensity control input of said Acceleration-Time cathode ray tube and connecting said clock to said horizontal and vertical sweep inputs of said Acceleration-Time cathode ray tube in such a way that threshold signals stored in said first and second acceleration display storage means appear as bright spots which are positioned in one direction from a median position in one display dimension to be representative of positive target acceleration and in the other direction from said median position to be representative of negative target accelerations and which in the other display dimension move from one side to the other of the display before disappearing.

9. The radar receiver and display system of claim 8 wherein the connection between said first and second acceleration display storage means and said threshold means includes an OR gate.

10. The radar receiver and display system of claim 5 wherein said threshold means includes a plurality of threshold devices which are individually connected by said analysis means to said plurality of storage devices in said range storage means.

11. The radar receiver and display system of claim 10 wherein said display means includes:

a Range-Time cathode ray tube having horizontal and vertical sweep and intensity control inputs;

a multiplexing device;

range display storage means having a capacity to store signals for a predetermined number of analysis periods and connected by said multiplexing device in sequence to individual ones of said plurality to threshold devices and driven by said clock in such a way that signals from said plurality of threshold devices are stored in a sequence representative of the range of a target and when said range display storage means has been filled by signals from said predetermined number of analysis periods, the signals from the oldest analysis periods are erased as newer signals are added and range display circuit means connecting the readout of said range display storage means to said intensity control input of said Range-Time cathode ray tube and connecting said clock to said horizontal and vertical sweep inputs of said Range-Time cathode ray tube in such a way that threshold signals stored in said range display storage means appear as bright spots which are positioned in one display dimension to be representative of target range and which in the other display dimension move from one side to the other of the display before disappearing.

12. The radar receiver and display system of claim 10 wherein said display means includes:

first, second and third cathode ray tubes, each having horizontal and vertical sweep and intensity control inputs;

multiplexing means functioning to connect the intensity control inputs of said first, second and third cathode ray tubes with each of said plurality of threshold devices during each of said plurality of frequency patterns produced by said variable frequency oscillator and sweep control means connecting said clock to said horizontal and vertical sweep control inputs of said first, second and third cathode ray tubes in a way such that for each analysis period said first cathode ray tube will display signals from said threshold devices as bright spots that are positioned in one display dimension to be representative of target velocity and the other display dimension to be representative of target range; said second cathode ray tube will display signals from said threshold devices as bright spots which are positioned in one direction from a median position in one display dimension to be representative of positive target acceleration and in the other direction from said median position to be representative of negative target acceleration and which are positioned in the other display dimension to be represenative of target range and said third cathode ray tube will display signals from said threshold devices as bright spots which are positioned in one direction from a median position in one display dimension to be representative of positive target acceleration and in the other direction from said median position to be represenative of negative target acceleration and which are positioned in the other display dimension to be representative of target velocity.

\* \* \* \* \*